United States Patent [19]
Uppal

[11] Patent Number: 5,975,138
[45] Date of Patent: Nov. 2, 1999

[54] FLUID CONTROLLER WITH IMPROVED FOLLOW-UP

[75] Inventor: Sohan L. Uppal, Bloomington, Minn.

[73] Assignee: Eaton Corporation, Cleveland, Ohio

[21] Appl. No.: 09/208,517

[22] Filed: Dec. 9, 1998

[51] Int. Cl.$^6$ ..................................................... F15B 13/04
[52] U.S. Cl. ........................ 137/625.24; 60/384; 91/467
[58] Field of Search .............................. 60/384; 91/467; 137/625.24

[56] References Cited

U.S. PATENT DOCUMENTS

| | | |
|---|---|---|
| 3,059,717 | 10/1962 | Moyer et al. . |
| 3,360,932 | 1/1968 | Lech et al. . |
| 4,069,743 | 1/1978 | Bertanza ................................ 91/375 R |
| 4,355,505 | 10/1982 | Liebert et al. .............................. 60/384 |

*Primary Examiner*—Gerald A. Michalsky
*Attorney, Agent, or Firm*—L. J. Kasper

[57] ABSTRACT

A fluid controller (15) of the type having a primary, spool valve (43) and a followup, sleeve valve (45) which define a relative neutral position (FIG. 1) and first and second maximum, opposite operating positions (L and R). The controller includes a fluid meter (29) having a member (51) which orbits and rotates. To impart the rotational movement of the member (51) to the follow-up valve (45), the present invention provides a shaft member (53) having a forward end (57) defining a diametral bore (67) with a pin member (69) in close fit relationship in the bore (67) and having ends (71) extending radially into axially elongated slots (75) defined by the sleeve valve (45). The axial length of the slots (75) is sufficient to permit the ends (71) of the pin member (69) to move to and fro as the metering member (51) orbits and rotates. The improved follow-up arrangement of the invention permits the spool and sleeve valves to be radially thicker, or to have smaller diameters, either of which will result in improved performance at less manufacturing cost.

5 Claims, 3 Drawing Sheets

FLUID CONTROLLER WITH IMPROVED FOLLOW-UP

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to hydrostatic power steering systems, and more particularly, to fluid controllers for use therein.

A typical fluid controller for use in a power steering system includes a housing which defines various fluid ports, and further includes a fluid meter and valving, operable in response to an input, such as the rotation of a vehicle steering wheel. The typical fluid controller also includes an arrangement for imparting follow-up movement to the valving in response to the flow of fluid through the valving and the fluid meter, during a normal steering operation. The flow of fluid through the controller valving is generally proportional to the rate at which the steering wheel is rotated.

A typical fluid controller of the type to which the present invention relates is illustrated and described in U.S. Pat. Nos. 4,804,016; 5,042,250; and 5,620,026, all of which are assigned to the assignee of the present invention and are incorporated herein by reference. In the conventional fluid controller shown in the above-cited patents, and sold commercially by the assignee of the present invention, the arrangement for imparting follow-up movement to the valving has included a drive shaft having a rearward end in splined engagement with the orbital and rotatable star of the fluid meter. The drive shaft has also included a forward end which is bifurcated, i.e., it defines an open, generally U-shaped portion disposed about a diametrally oriented pin member. The pin member passes through circumferentially elongated openings in the inner valve member (spool valve), and is received in a close fit relationship within holes defined by the outer valve member (sleeve valve). Therefore, in the conventional arrangement for imparting follow-up movement, the pin remains fixed relative to a diameter through the sleeve valve, while the surrounding, bifurcated forward end moves ("wobbles") relative to the pin as the rearward end of the drive shaft orbits and rotates.

The follow-up arrangement described above has been in use commercially for many years, and has been generally satisfactory, especially as long as the fluid pressures being controlled are relatively low, e.g., in the range of 1000 psi to 2000 psi. However, one disadvantage of the prior art follow-up arrangement relates to the bifurcated end of the drive shaft. As is understood by those skilled in the art, because there is relatively little area of engagement between the bifurcated end of the drive shaft and the diametral pin, that portion of the drive shaft has had to be made larger in the diametral direction, in order to provide reasonably satisfactory area of engagement of the drive shaft and the pin.

Unfortunately, even though the drive shaft has typically been relatively compact (i.e., having a small diameter) over most of its axial length, the requirement for the enlarged diametral dimension adjacent the pin has required that the inside diameter of the spool valve be larger than is really desirable, simply to accommodate the forward end of the drive shaft.

With the minimum inside diameter of the spool valve being thus determined, the designer of the fluid controller has, prior to the present invention, had two options. Either the radial thickness of the spool valve can be decreased, in which case the spool valve is more likely to be deflected inward by relatively higher fluid pressures, or the outside diameter of the spool valve can be made larger. In the latter case, the diameter of the sleeve valve will also have to be made larger, and as is well known to those skilled in the art, sealing of cylindrical clearances becomes more difficult and expensive as the diameter of the cylindrical clearance increases.

Another disadvantage of the prior art follow-up arrangement is the manufacturing cost of providing both the bifurcated forward end and a set of straight, internal splines within the central opening of the star, and a set of crowned, external splines about the rearward end of the drive shaft. Such splines typically require a relatively more sophisticated manufacturing operation, such as hobbing.

BRIEF SUMMARY OF THE INVENTION

Accordingly, it is an object of the present invention to provide a fluid controller having an improved arrangement for imparting follow-up movement to the controller valving, wherein the follow-up arrangement results in a reduced overall cost of manufacture of the controller.

It is a more specific object of the present invention to provide a fluid controller in which the follow-up arrangement makes it possible to optimize (typically, to reduce) the diameters of the spool and sleeve valve members.

It is another object of the present invention to provide a fluid controller in which the improved follow-up arrangement makes it possible to increase the radial thickness of the spool valve and/or the sleeve valve, thus permitting the controller to operate with higher fluid pressures.

It is a related object of the present invention to provide a fluid controller in which the improved follow-up arrangement, and the resulting increase in the radial thickness of the spool valve and/or the sleeve valve reduces fluid leakage by maintaining a more consistent radial clearance between the spool valve and the sleeve valve.

The above and other objects of the invention are accomplished by the provision of an improved fluid controller operable to control the flow of fluid from a source of pressurized fluid to a fluid pressure operated device. The fluid controller is of the type including housing means defining an inlet port for connection to the source of pressurized fluid, a return port for connection to a reservoir, and first and second control fluid ports for connection to the fluid pressure operated device. Valve means is disposed in the housing means and comprises a primary, rotatable valve member and a cooperating, relatively rotatable follow-up valve member, the primary and follow-up valve members defining a neutral position, and first and second maximum operating positions in which the primary valve member is rotatably displaced from the neutral position in first and second maximum, opposite directions, relative to the follow-up valve member. Included is a fluid actuated means for imparting follow-up movement to the follow-up valve member proportional to the volume of fluid flow through a main flow path defined by the housing means, the valve members, and the fluid actuated means, when the valve members are displaced from the neutral position. The fluid actuated means includes a metering member having orbital and rotational movement in response to the flow of fluid through the main flow path, and a shaft member having a first end orbital and rotatable with the metering member, and operable to impart the rotatable follow-up movement to the follow-up valve member.

The improved fluid controller is characterized by the shaft member having a second end disposed forward of the first end, the second end defining a diametral bore extending therethrough, and having an elongated pin member received within the diametral bore and in close fit relationship therein, and having ends extending radially outward therefrom. The primary valve member defines a pair of diametrically opposite openings, each of which extends circumferentially to permit relative movement of the pin member corresponding to the displacement of the primary valve member in the first and second maximum, opposite directions. The follow-up valve member defines a pair of diametrically opposite slots, wide enough circumferentially to receive the radially outward ends of said pin member. The openings defined by the primary valve member and the slots defined by the follow-up valve member have sufficient axial extent to permit the ends of the pin member to move to and fro, as the first end of the shaft member orbits and rotates.

DETAILED DESCRIPTION OF THE PREFERRED EMBODIMENT

Figure 1:
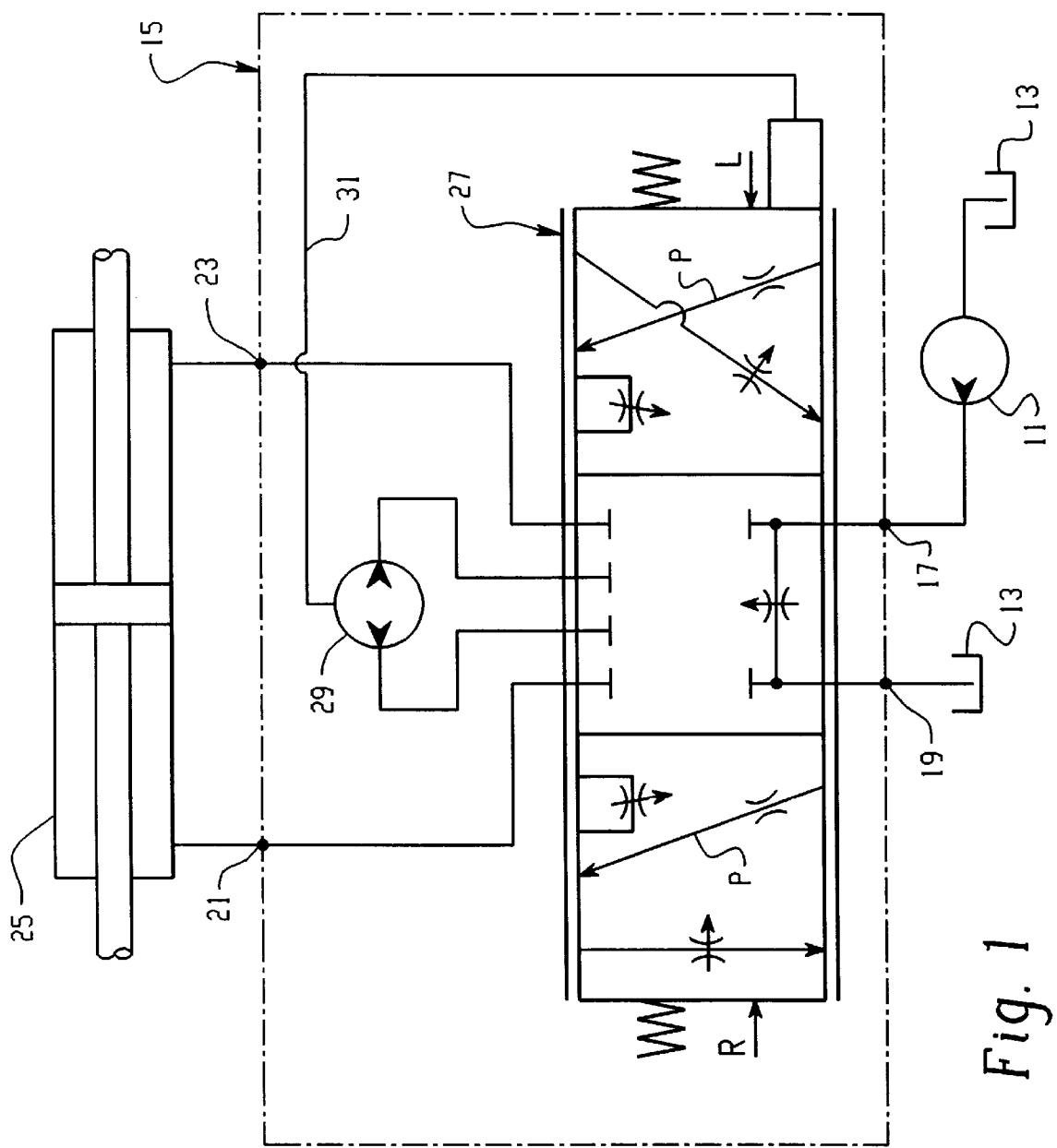
FIG. 1 is a hydraulic schematic of a hydrostatic power steering system including a fluid controller of the type to which the present invention relates.

Referring now to the drawings, which are not intended to limit the invention, FIG. 1 illustrates a hydraulic schematic of a vehicle hydrostatic power steering system, including a fluid controller made in accordance with the present invention. The system includes a fluid pump 11, shown herein as a fixed displacement pump, having its inlet connected to a system reservoir 13. The output of the pump 11 is directed to the hydrostatic steering system, and more specifically, to a fluid controller 15.

Referring still primarily to FIG. 1, the fluid controller 15 includes an inlet port 17, a return port 19, and a pair of control (cylinder) fluid ports 21 and 23, which are connected to the opposite ends of a vehicle steering cylinder 25.

The fluid controller 15, which may be of the general type illustrated and described in the above-incorporated patents, includes a valving arrangement, generally designated 27, which is moveable from its neutral position shown in FIG. 1 to either a maximum right turn position R or a maximum left turn position L, as will be described in greater detail subsequently. When the valving arrangement 27 is in either of the turn positions R or L, the pressurized fluid flowing through the valving 27 also flows through a fluid meter 29, one function of which is to measure (meter) the proper amount of fluid to be communicated to the appropriate control port 21 or 23. As is well known to those skilled in the art, the other function of the fluid meter 29 is to provide follow-up movement to the valving 27, such that the valving 27 is returned to its neutral position after the desired amount of fluid has been communicated to the steering cylinder 25. In FIG. 1, such follow-up movement is achieved by means of a mechanical follow-up connection, indicated schematically at 31.

As is also shown schematically in FIG. 1, the valving 27 defines a plurality of variable orifices whenever the valving is moved from its neutral position to one of its operating positions, either the right turn position R or the left turn position L. These variable orifices are well known to those skilled in the art, are illustrated and described in the above-incorporated patents, form no part of the present invention, and will not be described further herein. However, it should be noted in the schematic of FIG. 1 that the controller valving 27, in cooperation with the fluid meter 29 and a housing 33 (see FIG. 2) define a main flow path, designated "P" in FIG. 1, the main flow path P being generally understood as the path between the inlet port 17 and the control port (21 or 23) through which pressurized fluid flows out to the cylinder 25.

Fluid Controller 15

Figure 2:
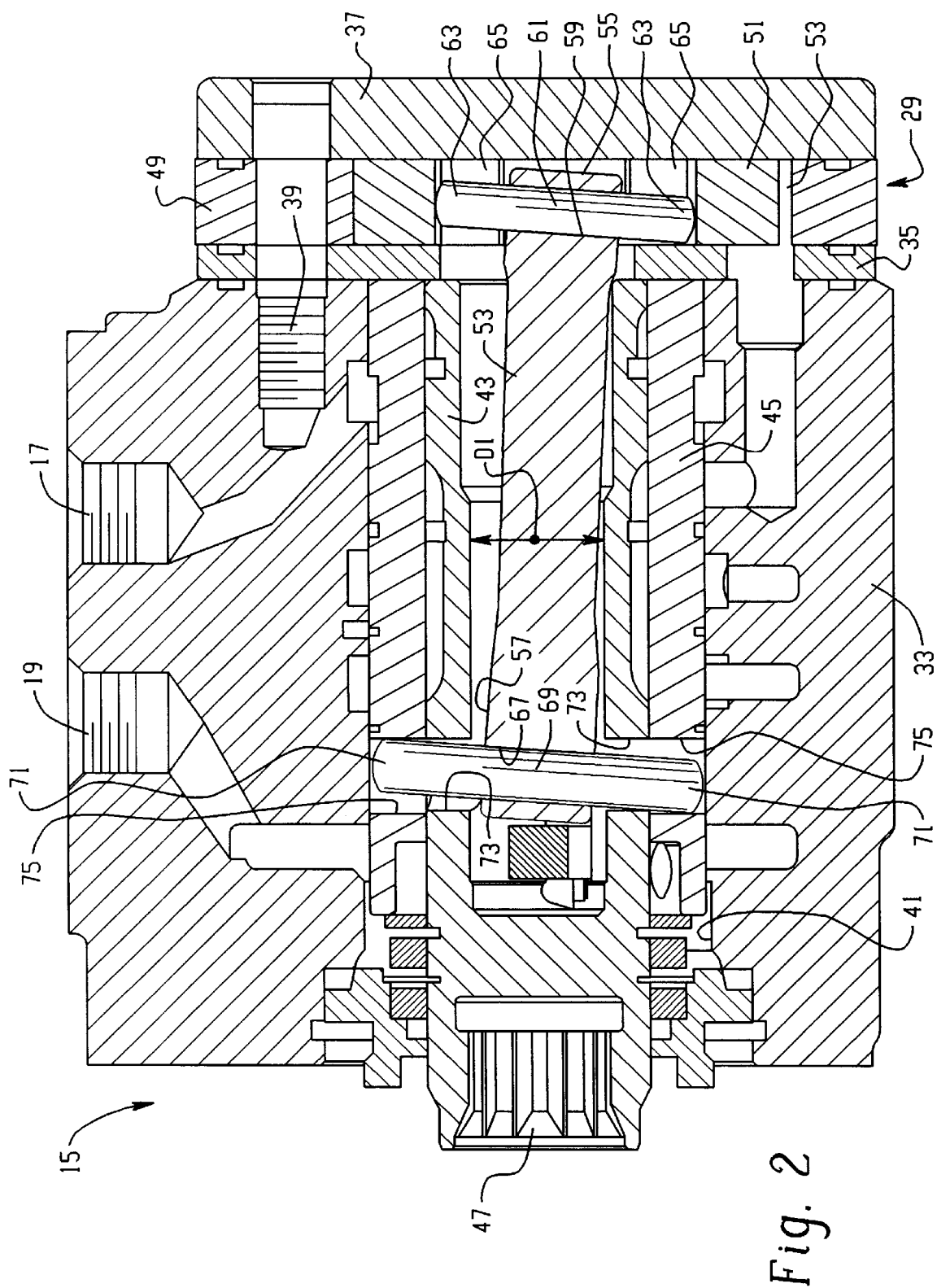
FIG. 2 is an axial cross-section of a fluid controller including the follow-up arrangement of the present invention.

Referring now primarily to FIG. 2, the construction of the fluid controller will be described in some detail. The controller 15 comprises several sections, including the housing section 33, a port plate 35, a section comprising the fluid meter 29, and an end plate 37. These sections are held together in tight, sealing engagement by means of a plurality of bolts (not shown herein) which extends through the end plate 37 and into threaded engagement with threaded bores 39 (only one of which is shown in FIG. 2) defined by the housing section 33. Typically, the housing section 33 defines the inlet port 17 and the return port 19 (shown in FIG. 2), and the control ports 21 and 23 (shown only in FIG. 1).

Rotatably disposed within a valve bore 41 defined by the housing section 33 is the valving arrangement 27, shown schematically in FIG. 1. The valving 27 comprises a primary, rotatable valve member 43 (hereinafter referred to as the "spool"), and a cooperating, relatively rotatable follow-up valve member 45 (hereinafter referred to as the "sleeve"). At the forward end of the spool 43 is a portion having a reduced diameter and defining a set of internal splines 47 which provide for a direct mechanical connection between the spool 43 and the steering wheel (not shown). The spool 43 and sleeve 45 will be discussed somewhat further subsequently.

The fluid meter 29 may be of the type well known in the art, and includes an internally toothed ring 49, and an externally toothed star 51. Typically, the star 51 has one less tooth than the ring 49, such that the communication of pressurized fluid into volume chambers 53, defined by toothed interaction of the star and ring, results in orbital and rotational movement of the star 51 within and relative to the ring 49, as is well known to those skilled in the art.

Figure 3:
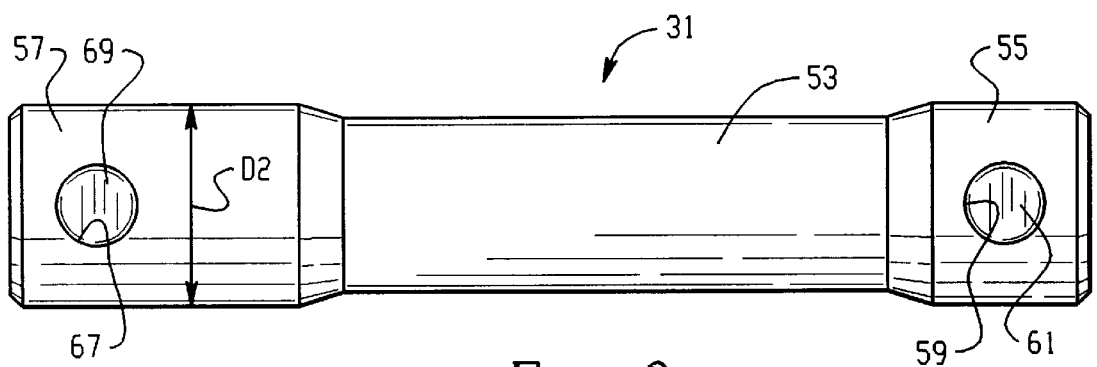
FIG. 3 is a top, plan view of the drive shaft which comprises one aspect of the present invention.

Referring now to FIG. 3 in conjunction with FIG. 2, the mechanical follow-up connection 31, shown schematically in FIG. 1, will be described in more detail. The connection 31 comprises a drive shaft 53 including a rearward end 55 which is received within the star 51, and a forward end 57, which is disposed toward the forward end of the spool 43 and sleeve 45, i.e., toward the internal splines 47. It should be noted that, in the subject embodiment, the rearward and forward ends 55 and 57 of the drive shaft 53 are somewhat larger in diameter than the main, central portion of the shaft 53. Those skilled in the art will understand that the various diameters are selected primarily on the basis of achieving the required torque transmitting capability.

Referring still to FIGS. 2 and 3, the rearward end 55 of the drive shaft 53 defines a diametral bore 59, and in close fit relationship within the bore 59 is an elongated pin member 61, the pin member 61 including radially outer ends 63 (seen only in FIG. 2). The outer ends 63 are received within slots 65 defined by the star 51, with the ends 63 being in a close fit relationship within the slots 65 to provide for a relatively tight, low backlash connection between the star 51 and the drive shaft 53. Thus, as the star 51 orbits and rotates, the rearward end 55 orbits and rotates. It should be understood that the arrangement just described for transmitting motion from the star 51 to the shaft 53 is not an essential feature of the present invention, although it is preferred, partly in order to eliminate the internal and external splines conventionally used.

The forward end 57 of the drive shaft 53 defines a diametral bore 67, and disposed in a close fit relationship within the bore 67 is an elongated pin member 69 which includes radially outer ends 71. As may best be seen in FIG. 2, the overall length of the pin member 69 should be just slightly less than the diameter of the valve bore 41, to minimize movement of the pin member 69 in a diametral direction within the bore 41.

Figure 4:
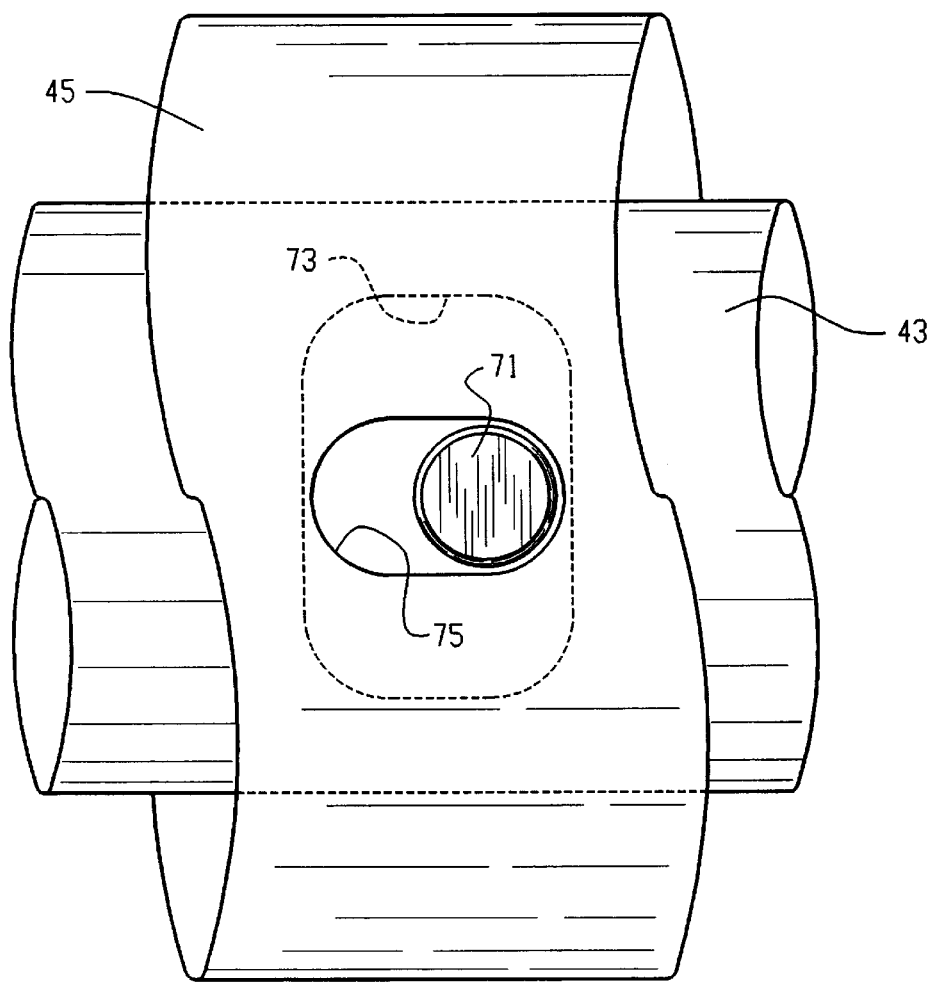
FIG. 4 is a fragmentary, enlarged view illustrating the follow-up arrangement of the present invention, with the valving in the neutral position.

Referring now to FIG. 4 in conjunction with FIG. 2, the radially outer ends 71 extend radially outward first through a pair of diametrically opposite openings 73 defined by the spool 43, then through a pair of diametrically opposite openings 75, defined by the sleeve 45. As was noted previously, FIG. 4 represents the spool 43 and sleeve 45 in their relative neutral (centered) position, the position shown schematically in FIG. 1. In the neutral position of the spool 43 and sleeve 45, the outer ends 71 of the pin member 69 are centered, in the circumferential direction, within each of the openings 73. Furthermore, each of the openings 73 must have a circumferential extent sufficient to permit relative rotation between the spool 43 and sleeve 45 to either the maximum right turn position R or the maximum left turn position L, both of which are shown schematically in FIG. 1.

In accordance with an important aspect of the present invention, the openings 73 and the openings 75 have substantially the same axial extent, i.e., left-to-right or vice versa in FIG. 4), although the opening 73 is shown as having a slightly greater axial extent, for ease of illustration only.

In FIG. 4, the opening 75 is shown, for ease of illustration, as being somewhat wider in the circumferential direction than the diameter of the pin member 69 and its outer ends 71. However, those skilled in the art will understand that there should preferably be as close a fit as possible, in the circumferential direction, between the end 71 and the opening 75. The opening 75 is elongated, in the axial direction, at least enough to permit the ends 71 of the pin member 69 to move in a to and fro direction, axially as the rearward end 55 of the drive shaft 53 orbits and rotates.

It will be appreciated by those skilled in the art that, in implementing the present invention, consideration will have to be given to the hardness of the elongated pin members 61 and 69, as well as to the relative hardness of the slots 65 and the openings 73 and 75, and in particular, the sides of the openings 75 which are regularly in engagement with the end 71.

An important aspect of the present invention is that it makes it possible, because of the large area of engagement between the bore 67 and the pin 69, to reduce the diameter of the forward end 57 of the drive shaft 53 so that it is just slightly larger in diameter than the main central portion of the shaft 53. As a result, it is possible to increase the radial thickness of both the spool 43 and the sleeve 45, while maintaining the diameter of the valve bore 41 the same as it was prior to the present invention. For example, the inside diameter of the spool valve is D1, which would be somewhat less than in the prior art controller of the same overall size, whereas the outside diameter of the forward end 57 is D2, with the diameter D2 being only slightly greater than the diameter D1. Alternately, it is possible to keep the radial thickness of the spool 43 and the sleeve 45 the same as they were prior to the present invention, but reduce the diameter of the valve bore 41 and of the spool 43 and sleeve 45, thus improving the ability to control the radial clearances therebetween.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A fluid controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means, and comprising a primary, rotatable valve member and a cooperating, relatively rotatable, follow-up valve member, said primary and follow-up valve members defining a neutral position, and first and second maximum operating positions in which said primary valve member is rotatably displaced from said neutral position in first and second maximum, opposite directions, relative to said follow-up valve member; fluid actuated means for imparting follow-up movement to said follow-up valve member proportional to the volume of fluid flow through a main flow path defined by said housing means, said valve members, and said fluid actuated means, when said valve members are displaced from said neutral position; said fluid actuated means including a metering member having orbital and rotational movement in response to the flow of fluid through said main flow path, and a shaft member having a first end which orbits and rotates with said metering member, and is operable to impart said rotatable follow-up movement to said follow-up valve member; characterized by:

(a) said shaft member having a second end disposed forward of said first end, said second end defining a diametral bore extending therethrough, and having an elongated pin member received within said diametral bore and in close fit relationship therein, and having ends extending radially outward therefrom;

(b) said primary valve member defining a pair of diametrically opposite openings, each of which extends circumferentially to permit relative movement of said pin member corresponding to said displacement of said primary valve member in said first and second maximum, opposite directions;

(c) said follow-up valve member defining a pair of diametrically opposite slots, wide enough circumferentially to receive the radially outward ends of said pin member; and (d) said openings defined by said primary valve member, and said slots defined by said follow-up valve member having sufficient axial extent to permit said ends of said pin member to move to and fro, as said first end of said shaft member orbits and rotates.

2. A controller as claimed in claim 1, characterized by said second end of said shaft member being disposed toward a forward end of said primary and follow-up valve members.

3. A controller as claimed in claim 1, characterized by said first end of said shaft member defining a diametral bore extending therethrough, and having an elongated pin member received within said diametral bore, and in close fit relationship therein, and having ends extending radially outward therefrom.

4. A controller as claimed in claim 3, characterized by said metering member having said orbital and rotational movement defining a pair of diametrically opposed, axially extending slots, and said ends of said elongated pin member associated with said first end of said shaft member being received within said slots for to and fro movement therein, as said metering member orbits and rotates.

5. A controller as claimed in claim 1, characterized by said primary valve member comprising a hollow, generally cylindrical member defining an inside diameter and said second end of said shaft member defining an outside diameter, wherein said inside diameter is only slightly greater than said outside diameter.

* * * * *